(12) United States Patent
Keshet et al.

(10) Patent No.: US 6,816,197 B2
(45) Date of Patent: Nov. 9, 2004

(54) BILATERAL FILTERING IN A DEMOSAICING PROCESS

(75) Inventors: Renato Keshet, Haifa (IL); Danny Barash, Haifa (IL); Doron Shaked, Haifa (IL); Michael Elad, Haifa (IL); Ronny Kimmel, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 09/814,672

(22) Filed: Mar. 21, 2001

(65) Prior Publication Data

US 2002/0186309 A1 Dec. 12, 2002

(51) Int. Cl.$^7$ ............................................... H04N 5/335

(52) U.S. Cl. ........................................ 348/273; 348/280
(58) Field of Search ........................ 348/207.99, 222.1, 348/266, 272, 273, 280, 282, 207.1; 382/167

(56) References Cited

U.S. PATENT DOCUMENTS

| | | |
|---|---|---|
| 4,642,678 A | 2/1987 | Cok |
| 5,373,322 A | 12/1994 | Laroche et al. |
| 5,382,976 A | 1/1995 | Hibbard |
| 5,475,769 A | 12/1995 | Wober et al. |
| 5,506,619 A | 4/1996 | Adams, Jr. et al. |
| 5,828,406 A | 10/1998 | Parulski et al. |
| 5,875,040 A | 2/1999 | Matraszek et al. |
| 6,404,918 B1 * | 6/2002 | Hel-or et al. ............... 382/167 |
| 2002/0149686 A1 * | 10/2002 | Taubman .................... 348/272 |
| 2003/0193567 A1 * | 10/2003 | Hubel ...................... 348/207.1 |
| 2003/0197796 A1 * | 10/2003 | Taubman .................... 348/272 |

OTHER PUBLICATIONS

Tomasi C et al: "Bilateral filtering for gray and color images" 6th International Conference on Computer Vision (IEEE CCAT. NO. 98Ch36271, Jan. 4–7, 1998 pp. 839–846 XP000926378.

Taubman D: "Generalized wiener reconstruction of images from colour sensor data using a scale invariant prior" Proceedings of 7th IEEE International Conference on Image Processing, Vancouver, BC, Canada Sep. 10–13, 2000 pp. 801–804 XP010529589.

Kimmel R: "Demosaicing: image reconstruction from color CCD Samples" IEEE Transactions on Image Processing Sep. 1999, IEEE, USA vol. 8, No. 9, pp. 1221–1228 XP002237072.

Taubman, David, "Generalized Wiener Reconstruction of Images from Colour Sensor Data Using a Scale Invariant Prior," Proceedings of the International Conference on Image Processing (ICIP 2000), Vancouver, Canada, Sep. 2000.

Tomasi, C., and Manduchi, R., "Bilateral Filtering for Gray and Color Images," Proceedings of the 1998 IEEE International Conference on Computer Vision, Bombay, India.

* cited by examiner

Primary Examiner—Tuan Ho

(57) ABSTRACT

Demosaicing convolution kernels are incorporated into the framework of bilateral filtering in order to reduce artifacts at abrupt intensity transitions when a color mosaic pattern is converted to an output image. As a consequence of the bilateral filtering within a window that is selected without intensity considerations, intensity values of pixels that are physically close are given greater weight than intensity values of more distant pixels and, simultaneously, intensity values that are quantitatively similar (i.e., photometrically similar) are given greater weight than intensity values that are quantitatively dissimilar. Using photometric similarity in a demosaicing operation reduces the effects of pixels on one side of an abrupt intensity transition in determining interpolated intensity values for pixels on the opposite side of the abrupt intensity transition.

21 Claims, 4 Drawing Sheets

BILATERAL FILTERING IN A DEMOSAICING PROCESS

TECHNICAL FIELD

The invention relates generally to manipulating image information and more particularly to methods and systems for reconstructing an image from a mosaic pattern of intensity values for different colors.

BACKGROUND ART

A digital color image consists of an array of pixel values representing the color intensities at each point of the image. Typically, three colors are used to generate the image, with the intensity of each of the colors being identified for each pixel. In reconstructing the image, the three intensities are combined on a pixel-to-pixel basis to determine the image that is printed or displayed to a viewer.

Conventional color photography utilizes three overlapping color sensing layers having sensitivities in different regions of the color spectrum. Typically, red, green and blue are the three selected colors. However, digital cameras are limited to a single array of sensors, so that there is only one "layer." Within this layer, each sensor determines the intensity of a particular color. As a result, the sensor array does not produce a color image in the traditional sense, but rather a collection of individual color samples. The assignment of the colors to the individual pixels within the array is sometimes referred to as the color filter array (CFA) or the color "mosaic pattern." To produce a true color image, with a full set of color samples at each pixel, a substantial amount of computation is required to estimate the missing information. The computational operation is typically referred to as "demosaicing."

Since only one color is sensed at each pixel, two-thirds of the spectral information is missing. To generate the missing information at a particular pixel, information from neighboring pixels may be used, because there is a statistical dependency among the pixels in the same region of a particular image. A number of demosaicing algorithms are available. "Bilinear interpolation" is an approach that attempts to minimize the complexity of the demosaicing operation. A bilinear interpolation algorithm interpolates color intensities only from the same-color sensors. That is, the red sensors are treated independently from the green and blue sensors, the green sensors are treated independently from the red and blue sensors, and the blue sensors are treated independently from the red and green sensors. To provide a red intensity value at a given pixel, the values measured by the red sensors in a designated size neighborhood (e.g., in a neighborhood of nine sensors having the given pixel as its center) are interpolated. If the mosaic pattern of sensors is a Bayer pattern (i.e., a repeating 2×2 sensor array kernel having two green sensors diagonally positioned within the kernel and having one red sensor and one blue sensor), the bilinear interpolation algorithm may use twelve kernels of convolution to reconstruct the image. However, while the approach of isolating the different colors in the demosaicing operation provides a relatively low level of computational overhead, the reconstructed image lacks the sharpness of conventional color photography. As will be explained below, there is an unfortunate tradeoff between minimizing artifacts and maximizing sharpness.

Another approach is described in U.S. Pat. No. 5,475,769 to Wober et al. In this approach, the color sensors are no longer treated as being independent of sensors of other colors. As in the bilinear interpolation approach, a defined-size neighborhood of pixels is "moved" about the mosaic pattern and an intensity value is determined for the pixel that is at the center of the neighborhood. Each pixel in the neighborhood is weighted for each color sensitivity relative to the center pixel. The missing color intensity values for each sensor pixel are estimated by averaging the weighted pixels in the neighborhood for each color band. The neighborhood data and the pixel data are arranged in a matrix and vector expression having the form $A*W=X$, where A is a matrix of neighborhood values, W is a vector representing the weighting coefficients, and X is a vector of color components of the particular wavelength of the center pixel. The weighting coefficients may be determined using a linear minimum mean square error (LMMSE) solution.

A single pixel array may be viewed as consisting of a number of separate planes of pixels in which each plane has sensors of the same color. Since the pixels do not overlap, the sensors in the various planes are at different locations. Demosaicing approaches that take weighted averages across more than one monochromatic plane make use of the statistical dependencies among the sample locations. In effect, the blurring of an image by the camera optics allows a true object edge (i.e., an edge of one of the objects being imaged) that would exist precisely on the sensors of one of the monochromatic planes to also be seen in the other color planes, since the image is spread by the blurring onto the sensors of the other monochromatic planes.

While the blurring that is introduced by the camera optics aids in the demosaicing operation to reconstruct an image, the demosaicing operation should not enhance the blurring or add any other artifacts to the reconstructed image. The goal of demosaicing algorithms should be to faithfully reconstruct the image, so as to provide a true-color, sharp print or display. One problem is that the interpolation approaches tend to introduce artifacts at abrupt changes in intensity. As an example of an abrupt transition, a digital picture that is captured in a poorly lit room will have a sharp transition along any source of illumination. Sharp transitions also occur at borders between two bright colors. Because most known interpolation algorithms provide estimation within a neighborhood that is not dependent upon identifying transitions, the averaging that occurs along the transitions will consider both the high intensity values on one side of the transition and the low intensity values on the opposite side. This space-invariant interpolation dulls the image along the transition. That is, the reconstructed image loses some of its sharpness. The degree of sharpness loss will partially depend on the emphasis on controlling the introduction of artifacts at the abrupt intensity transitions (i.e., there is a sharpness/artifact tradeoff).

A space-invariant approach that is designed to increase sharpness may be referred to as the Generalized Image Demosaicing and Enhancement (GIDE) approach of David Taubman. GIDE minimizes an error estimate of the original scene reconstruction on the basis of factors that include sensor characteristics, models of the relevant imaging system and Wide Sense Stationary (WSS) noise, and prior image statistical models. The approach is outlined in a publication by David Taubman entitled, "Generalized Wiener Reconstruction of Images from Colour Sensor Data Using a Scale Invariant Prior," Proceedings of the International Conference on Image Processing (ICIP 2000), Vancouver, Canada, September, 2000. While the approach works well in most instances, there is a tendency to "over-sharpen" at the edges of abrupt changes in intensity. That is, if there is an abrupt transition from a first intensity level to a significantly higher second intensity level, the interpolated pixel values for pixels immediately before the transition may drop significantly below the first level, while the pixels located at and immediately after the abrupt transition may be assigned interpolated pixel values that are significantly above the second intensity level. The over-sharpening introduces artifacts into the reconstructed image. While the artifacts are less visually displeasurable than those introduced by other approaches, the artifacts are apparent.

A space-variant approach is described in U.S. Pat. No. 5,373,322 to Laroche et al. and U.S. Pat. No. 5,382,976 to Hibbard, each of which is assigned to Eastman Kodak Company. The Laroche et al. patent relates to interpolating chrominance values, while the Hibbard patent uses the same techniques for interpolating luminance values. Regarding Laroche et al., a digital processor obtains gradient values from the differences between chrominance values in the vertical image directions and the horizontal image directions from a particular pixel of interest. The gradient values are compared with each other in order to select one of the directions as the preferred orientation for the interpolation of additional chrominance values. The interpolation is then performed upon values that are selected so as to agree with the preferred orientation. By performing the comparison of the gradient values, edge artifacts are reduced and image sharpness is enhanced.

U.S. Pat. No. 5,875,040 to Matraszek et al. is another Eastman Kodak Company patent that calculates a direction before pixel interpolation is performed. The Matraszek et al. patent is used to correct defect pixels in a defect region of a source image. The method includes the step of searching for edges in a non-defect region of the image having the defect region. Once the edges of the non-defect region are identified, pixel signals for the defect region are based on the pixel signals for non-defect pixels lying in a direction from the defect pixel which is determined by the direction of the edge. Preferably, both a directional angle and a magnitude are calculated in the detection of the edges. An edge directional angle is defined as being perpendicular to the gradient direction at the pixel being considered. One way of locating the edges is described as selecting the non-defect region as a "sliding" window of limited dimensions adjacent to the defect region, with the window defining a local non-defect region. The patent notes that adjacent does not necessarily mean immediately adjacent, since there may be some preselected distance separating the center of the window or the end of the window from the defect region. The edge of the window can then be located using a gradient field. Using the described method, pixel values can be based upon pixel values from non-defect regions.

By properly selecting the direction from which other pixel values are to be selected in the determination of a particular pixel value, the introduction of artifacts can be controlled. However, the process of first determining the direction and then determining the pixel value is computationally complex. Numerous iterations may be necessary.

What is needed is a method and system for faithfully reconstructing an image from a mosaic pattern of color information without a high level of computational overhead.

SUMMARY OF THE INVENTION

Preservation of intensity transitions is enhanced in a demosaicing operation by utilizing bilateral filtering, which will be explained below. As a result, interpolations among neighboring pixels in a mosaic pattern of color pixels are based upon factors that include the relative position and photometric similarity of pixel values within a window that is intensity insensitive. By "intensity insensitive" what is meant is that the position of the window is not a function of photometric similarity or dissimilarity within an image. Rather, photometric similarity is a factor after the position of the window has been determined. Thus, within a fixed-orientation window for determining an intensity value for a specific pixel, intensity values of pixels that are physically close are given greater weight than intensity values of more distant pixels and, simultaneously, intensity values that are quantitatively similar are given greater weight than intensity values that are quantitatively dissimilar. By reducing the effect of pixels on one side of an abrupt intensity transition in determining the interpolated intensity values on the opposite side of the abrupt intensity transition, the sharpness of the transition is enhanced in the reconstructed image. Thus, the adverse effects of the conventional tradeoff between sharpness and artifact-free reconstruction are at least partially eliminated.

While the invention may be used with bilinear interpolation demosaicing, another embodiment is one in which all of the intensity values within a given-sized window of the mosaic pattern are considered in determining the intensity values for pixels in the general center of the neighborhood ("general" center because the precise center may not coincide with the physical location of any pixel, depending on the parameters of the given-sized window). Thus, demosaicing includes utilizing at least $P_s \times P_t$ different convolution kernels, where $P_s$ is the number of possible color arrangements within the given-sized neighborhood and where $P_t$ is the number of different colors In the mosaic pattern. For a Bayer pattern $P_s=4$ and $P_t=3$, so that there will be twelve convolution kernels. From the previous description of the Bayer pattern, it can be recognized that a small scale implementation of this embodiment, from which larger scale mosaic patterns may be extended, would be

| R | G | R | G |
|---|---|---|---|
| G | B | G | B |
| R | G | R | G |
| G | B | G | B. |

In the bilateral filtering, a similarity function that is indicative of the photometric similarity among intensity values of neighboring pixels is algorithmically combined with determinations of the relative position of the neighboring pixel locations. For each pixel in an image to be reconstructed, the similarity function is applied after the neighborhood of relevant pixels has been selected. As a result of the algorithmic combination, statistical dependencies among the intensity values within the selected neighborhood are more reliably estimated. In one embodiment, the similarity function defines coefficients that are multiplied by the determinations of relative position. In this embodiment, the similarity function returns coefficients that are close to "1" for small absolute photometric dissimilarity and tends to "0" as the photometric dissimilarity is increased. Thus, the similarity function will have little effect in image regions with slowly varying intensities, but will inhibit artifacts around highly contrasted transitions within the image.

The demosaicing process may be considered as forming a number of monochromatic image planes, such as a green image plane, a red image plane and a blue image plane. In one embodiment, each output image plane has the same number of pixels as the original mosaic pattern and each pixel includes an intensity value. Thus, each pixel location is assigned three intensity values (i.e., one intensity value for each monochromatic image), with each intensity value being based upon the relative positions of the pixel location to selected other pixel locations and photometric similarities to intensity values of the selected pixel locations. The selected pixel locations are those that are contained within the given-sized window that has the particular pixel location as its general center, since the position and orientation of the window are intensity insensitive. It should be noted that the shape of the window is not important to the practice of the invention.

The system for carrying out the invention includes a two-dimensional array of sensors in which the sensors are color-specific. While not critical, the sensors may be arranged in the Bayer pattern. Connected to the sensor array is an input that receives signals in a format representative of the mosaic pattern. Demosaicing process software/hardware is enabled to generate intensity values for each of the different colors at each of the discrete pixel locations of the original mosaic pattern. The demosaicing capability includes a bilateral filter that is configured to access the spectral information of the mosaic pattern and to process the spectral information such that intensity values are generated on the basis of both relative position of pixel locations and photometric similarity of spectral information. In one embodiment, the demosaicing capability also includes a multiplier having a first input that is responsive to calculations of relative position between first and second pixel locations within the mosaic pattern and having a second input that is responsive to calculations of photometric similarity between the spectral information contained within the first and second pixel locations. For embodiments in which the mosaic pattern is the Bayer pattern, twelve stored convolution kernels having adaptive coefficients are utilized.

An advantage of the invention is that known linear reconstruction filters, such as Wiener filters, may be modified to become transition and texture sensitive. Apart from being adaptive, the demosaicing having bilateral filtering requires no iterations. This is in contrast to systems in which edges of abrupt intensity (color or luminance) must be identified before interpolation can occur. The transition and texture sensitivity is achieved by causing the process to become space variant, but with only a small amount of additional computational overhead. Applying bilateral filtering to "correct" artifacts in demosaicing may be used in applications such as digital cameras in order to enhance sharpness in the reconstruction of a substantially artifact-free image.

DETAILED DESCRIPTION

Figure 1:
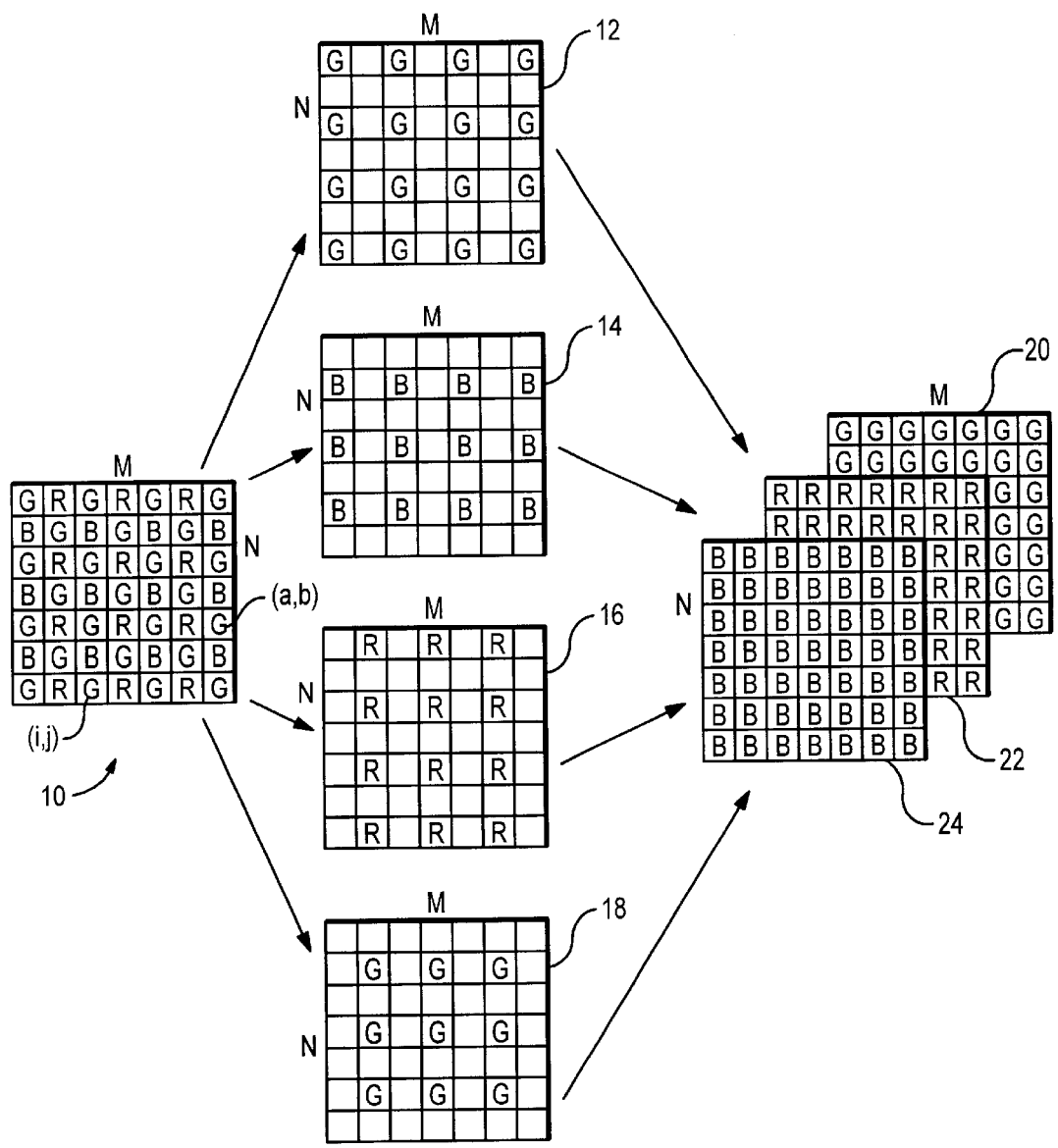
FIG. 1 is a schematic representation of a demosaicing operation in accordance with one embodiment of the invention.

With reference to FIG. 1, an image sensor array 10 is represented by a mosaic pattern that follows an arrangement referred to as a Bayer pattern. The sensor array is a color-sampling device that acquires its samples using a number of discrete color-specific detectors. The array may have 1500 columns and 1500 rows, but the values of M and N are not critical to the invention.

The image that is captured using the sensor array 10 may be considered as being decomposed into four input image planes 12, 14, 16 and 18. Each input image plane satisfies two conditions. First, the planes have the identical number of samples within a horizontal and vertical sampling interval. Second, all of the samples in a given input image plane must have identical color properties, although multiple image planes can have the same color properties. For example, the image planes 12 and 18 include green samples, as indicated by the letter "G." Image plane 14 includes all of the samples that are specific to the color blue, as indicated by the letter "B," while image plane 16 includes all of the red samples from the sensor array 10, as indicated by the letter "R." While the illustrated embodiment shows a Bayer pattern, any regular sampling lattice can be decomposed into a set of image planes as shown in FIG. 1.

In FIG. 1, there are a total of three different colors ($P_t=3$) and there are four possible color arrangements ($P_s=4$) within a two-by-two neighborhood of pixels. The number of possible color arrangements is consistent with the four imaging planes 12, 14, 16 and 18. In this illustrated embodiment, demosaicing utilizes twelve convolution kernels ($P_s \times P_t=12$). The twelve convolution kernels are selected on the basis of which of the input image planes contains the sample for the pixel that is at the present center of the movable neighborhood in which interpolation occurs and on the basis of which monochromatic output plane 20, 22 and 24 is presently being constructed. Each monochromatic output plane contains interpolated intensity values that are derived from the intensity values of the input image planes 12, 14, 16 and 18. Techniques for deriving the output intensity values are known in the art. For example, linear interpolation may be used. However, in one embodiment, the Generalized Image Demosaicing and Enhancement (GIDE) approach is employed. In this approach, the scene statistics and physical properties of the acquisition device (e.g., the focusing optics for the sensor array 10) are considered in producing convolution kernels.

Figure 2:
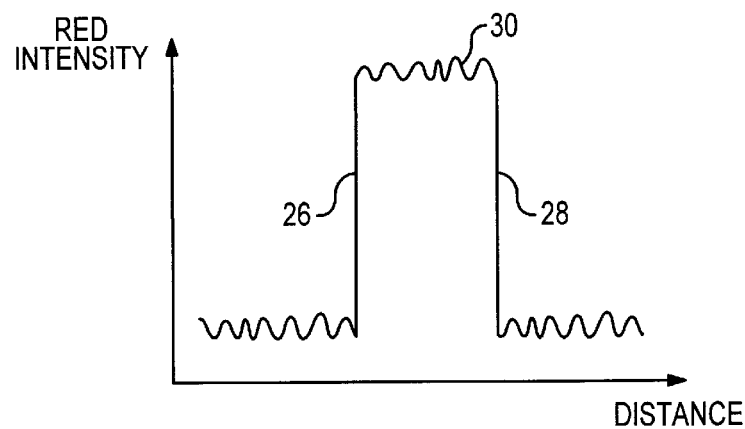
FIG. 2 is a plot of intensity as a function of distance across one of the output planes of FIG. 1, with the intensity measures being unfiltered.

A concern with the known approaches to deriving the intensity values of the monochromatic output planes 20, 22 and 24 is that artifacts are often introduced into the final image that is formed from the output planes. Notably, artifacts are often introduced as a result of abrupt intensity transitions within the captured image. Referring now to FIG. 2, a graph of intensity as a function of distance across a sensor array 10 is shown as including two abrupt transitions 26 and 28 on opposite sides of a plateau 30. The response shown in FIG. 2 may occur when the pixels corresponding to the plateau 30 image a light source, while the pixels on opposite sides of the plateau image dark areas. The flat regions of the response of FIG. 2 are unsmooth, since some noise is generated in capturing the imaging signal.

One source of artifacts is most clearly understood when referring to bilinear interpolation. As previously noted, bilinear interpolation bases pixel values upon neighboring pixel values for sensors of the same color. As an example, for a pixel within the red image plane 16 of FIG. 1, only pixel values of the same image plane are considered in an interpolation step. Since the Bayer pattern has alternating rows of red pixels and blue pixels, a diagonally extending abrupt intensity transition will have an easily detectable remnant of the mosaic pattern when the edge of the abrupt intensity transition is closely viewed in the reconstructed image. This remnant will appear as a diagonal pattern of alternating red and blue pixels along the transition.

Figure 3:
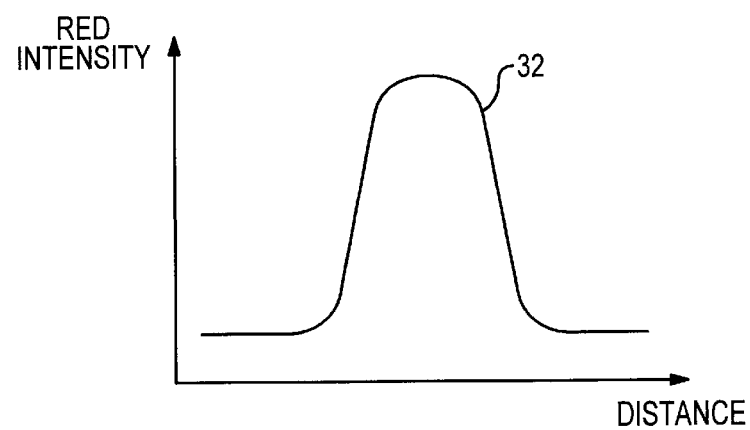
FIG. 3 is a plot of the same determination of intensity, but with filtering in accordance with the prior art.

A second source of artifacts will be described with reference to FIGS. 2 and 3. The abrupt transitions 26 and 28 of FIG. 2, as captured by the sensor array 10 of FIG. 1, are blurred if the intensity values of the monochromatic output planes 20, 22 and 24 are determined using a simple averaging approach to interpolation. For example, the interpolated intensity values prior to the abrupt transition 26 will be determined to be inaccurately high, since they will be averaged with the intensity values with at least some of the pixels corresponding to the plateau 30. Similarly, the initial intensity values of the plateau 30 will be inaccurately low, since they will be averaged with the pixels immediately prior to the abrupt transition 26. A similar "smoothing" will occur at the abrupt downward transition 28. The resulting response 32 is represented in FIG. 3. Such a response is most likely to occur if demosaicing is used with linear filtering.

The GIDE approach and other interpolation approaches address this "smoothing" concern in a manner that presents another type of color artifact. This artifact may be referred to as "oversharpening." Still referring to FIGS. 2 and 3, a pixel that precedes the abrupt transition 26 may be "depressed" in order to overcome the error that would be introduced by simple averaging. Similarly, a pixel which immediately follows the abrupt transition 26 may be inflated in order to overcome the averaging difficulties. However, often overcompensation will occur, so that pixels immediately before the abrupt transition will be assigned values that are too low, while pixels immediately following the transition will be assigned values that are statistically too high. Similar ascending and descending humps in the response will occur on opposite sides of the second abrupt transition 28, but in the opposite order.

Figure 4:
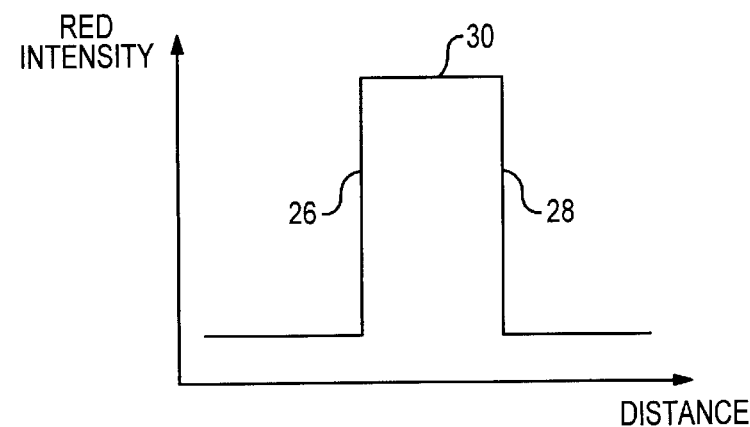
FIG. 4 is the same plot of intensity as FIG. 2, but with bilateral filtering in accordance with the invention.

In accordance with the invention, the artifacts are avoided by incorporating demosaicing convolution kernels into the framework of bilateral filtering. Thus, in addition to utilizing relative position as a basis for interpolating intensity values, photometric similarity is considered. Referring to FIG. 4, the use of bilateral filtering preserves the abrupt transitions 26 and 28 on opposite sides of the plateau 30. Consequently, a sharper final image is rendered by the process. The use of such filtering to perform denoising (as opposed to demosaicing) is described by C. Tomasi and R. Manduchi in the publication entitled "Bilateral Filtering for Gray and Color Images," *Proceedings of the 1998 IEEE International Conference on Computer Vision, Bombay, India*.

"Relative position" as used herein refers to the consideration of the coordinates of two pixels for which intensity values are being considered. Referring to FIG. 1, the relative position of a first pixel i,j with respect to a second pixel a,b may be determined simply on the basis of the coordinate i-a, j-b. In a demosaicing operation, a "movable" window is used and the pixel i,j for which an intensity value is being interpolated is located at the general center and is compared with the intensity value for each other pixel (ξ) in the neighborhood. In accordance with the invention, the shape of the window is not critical and the position and orientation of the movable window are insensitive to the abrupt transitions. That is, the window for a given pixel is intensity insensitive.

"Photometric similarity" as used herein refers to the extent to which two pixel values are quantitatively similar. Referring to FIG. 2, the pixel values in the region prior to the abrupt upward transition 26 are photometrically similar. Similarly, the intensity values for the pixels aligned with the plateau 30 are photometrically similar. However, the intensity values for pixels on opposite sides of the abrupt transition 26 are photometrically dissimilar.

Incorporating linear interpolation convolution kernels into the framework of bilateral filtering provides a result in which for every pixel position (i,j) in the input image I captured by the sensor array 10 of FIG. 1, a filtered output h(i,j) is returned according to the following equation:

$$h(i, j) = \frac{\sum_a \sum_b I(a, b)k(i-a, j-b)s[I(i,j)-I(a,b)]}{\sum_a \sum_b k(i-a, j-b)s[I(i,j)-I(a,b)]} \quad (1)$$

where k(·,·) is a predefined two-dimensional spatial kernel which considers relative positions and s(·) is a predefined one-dimensional similarity function that incorporates photometric similarity. Thus, k(i-a,j-b) is responsive to the relative position between the pixel position (i,j), and a nearby pixel position (a,b), while s[I(i,j)-I(a,b)] is responsive to the degree to which intensity values at positions (i,j) and (a,b) are similar. In one embodiment, the spatial kernels are determined by GIDE, so that the incorporation into the bilateral filtering may be referred to as BiGIDE. However, other demosaicing kernels may be used.

While the embodiment that uses Equation 1 has advantages, other algorithms that incorporate convolution kernels into the framework of bilateral filtering may be used. However, if Equation 1 is employed, particular interest is given to similarity functions that return a value close to "1" for small absolute dissimilarity values and that return values tending to "0" as the photometric dissimilarity increases. For example, in FIG. 2, the intensity values along the plateau 30 are photometrically similar, so that the similarity function returns a value at or near "1." On the other hand, intensity values on opposite sides of the abrupt transition 26 are photometrically dissimilar, so that the similarity function returns a value that is substantially closer to "0." In its simplest form, the similarity function may be Gaussian, with a crest of "1" that corresponds to a determination that two intensity values are identical. In this case, the similarity function will play only a small role in the demosaicing of image regions in which intensity values vary only slowly, but will function to reduce incorporation of artifacts in high contrasted regions of the image.

Figure 5:
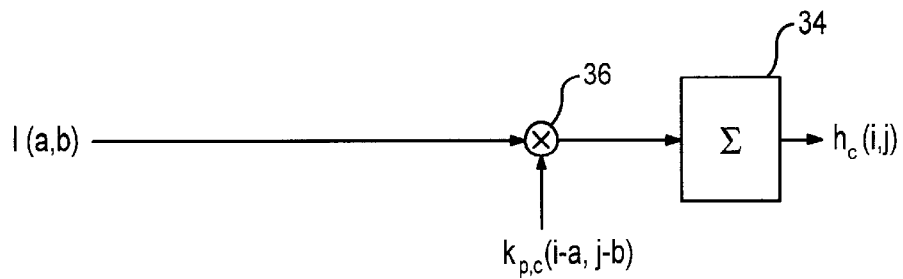
FIG. 5 is a schematic diagram of selected components of a demosaicing system in accordance with the prior art.

FIG. 5 illustrates a prior art arrangement that enables demosaicing by linear convolution, but without bilateral filtering. A summation device 34 is used to accumulate values for forming one of the monochromatic output planes 20, 22 and 24 of FIG. 1. The summation device outputs C values for each coordinate position i,j in the sensor array 10, where C is the desired number of color planes in the output image process. Each output color plane is indexed by the symbol c, which assumes integer values ranging from one to C. Typically, C is equal to 3. For each output value, the summation device receives an input for each of the pixels a,b in the sensor array 10 that is located within a movable window having pixel i,j at its general center. The selection of the appropriate convolution kernel (k) that is utilized will depend upon the position p and the color c of the output. In the embodiment of FIG. 1, there will be twelve convolution kernels $k_{p,c}$, as previously explained.

The prior art application of FIG. 5 includes a multiplier 36 that is used in determining the value of $h_c(i,j)$. The intensity values at each of the pixels within the window having pixel i,j as its general center are multiplied by the result from the appropriate kernel $k_{p,c}$. This result is responsive to relative positioning. This process repeats for each pixel of the monochromatic output plane 22 and also repeats in forming the other two monochromatic output planes 20 and 24 of FIG. 1.

Figure 6:
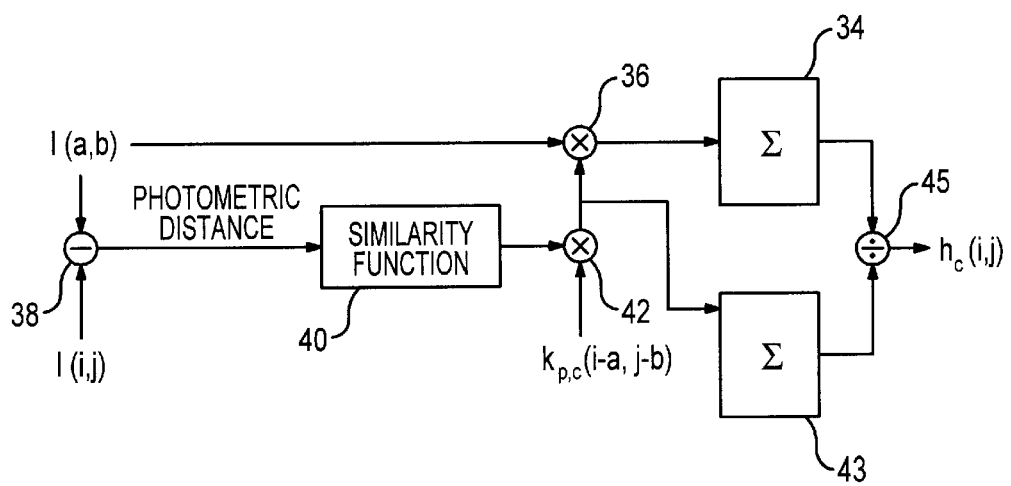
FIG. 6 is a schematic diagram of selected components of one embodiment of a demosaicing system having bilateral filtering in accordance with the invention.

While relative positions are considered in providing the input to the multiplier 36 from kernel $k_{p,c}$, photometric similarity is not considered. Referring now to FIG. 6, the invention adds a differencing circuit 38 and a similarity function device 40, so that the system provides a determination of interpolated intensity values $h_c(i,j)$ that is responsive to both relative positions and photometric similarities within the movable window that defines the neighborhood having pixel i,j at its general center. The differencing circuit 38 determines the photometric "distance" between the intensity value at pixel i,j and the intensity value at a pixel a,b within the neighborhood. This sequentially occurs for each pixel within the neighborhood having pixel i,j as its general center.

The output of the differencing circuit 38 is the photometric distance that is received by the similarity function device 40. In one embodiment, the similarity function that is employed by the device 40 is Gaussian, with a crest of "1" that is output as a result of determining that the intensity values at pixel i,j and pixel a,b are identical. However, the output of the similarity function device tends toward "0" as the absolute of the output of the differencing circuit 38 increases.

A multiplier 42 has a first input from the similarity function device 40 that is responsive to photometric similarity and has a second input that is responsive to the relative positions of the pixels i,j and a,b. This second input may be identical to the one described with reference to FIG. 5. When the similarity function device 40 has an output of "1" (i.e., when the intensity at pixel i,j is equal to the intensity at pixel a,b), the input to the summation device 34 will be identical to the input that was described with reference to FIG. 5. On the other hand, if the intensity values at the two pixels are photometrically "distant," the physical proximity of the two pixels will have less effect than in the prior art arrangement.

The embodiment of FIG. 6 utilizes normalization. Thus, this embodiment incorporates all of the features of Equation 1, since the denominator of Equation 1 is designed to achieve normalization. The output of the multiplier is directed to the multiplier 36 and to a second summation device 43. The denominator of Equation 1 is the output of the second summation device 43, while the numerator is the output of the first summation device 34. A divider 45 receives the two outputs of the summation device and calculates $h_c(i,j)$. Normalization is not critical to the invention, so that the second summation device and the divider can be eliminated. In FIG. 6, the various components may be implemented in computer software (e.g., in different modules of an application program), in hardware, or in a combination of software and hardware.

Figure 7:
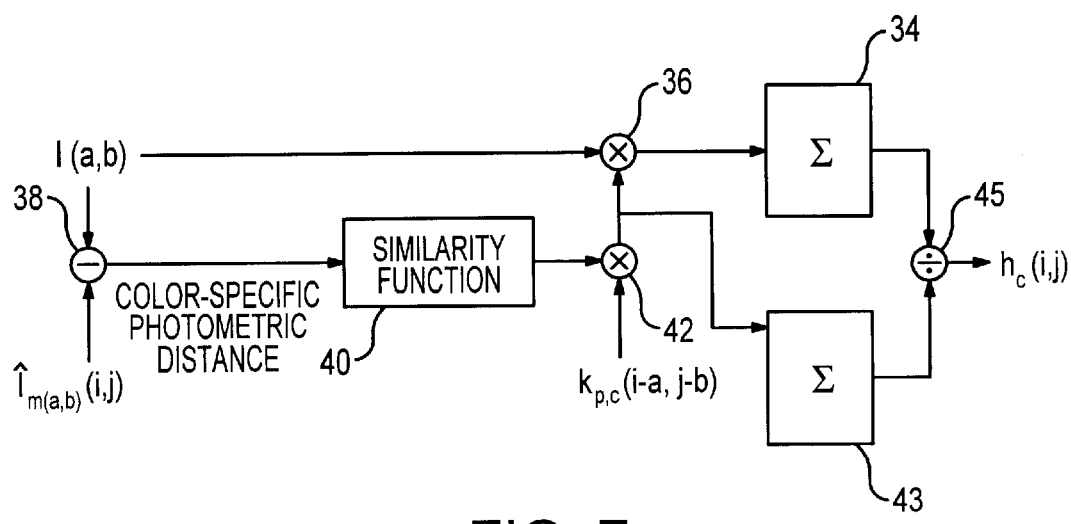
FIG. 7 is a schematic diagram of a second embodiment of a demosaicing system having bilateral filtering in accordance with the invention.

FIG. 7 illustrates a second embodiment of the invention. In this system 44, a convolution system such as the one described in FIG. 5 is used to generate pre-demosaiced image $Î(i,j)$, the values of which are used selectively as inputs to the differencing module 38. Thus, pre-demosaicing of an image occurs in order to provide the color-specific values. If three color planes are being formed, the convolution system will provide three different intensity values for each pixel. The color component of $Î(i,j)$ selected as input to the differencing module 38 is the same mosaic color as that of the entry I(a,b), and is designated m(a,b). The selected color component is designated $Î_{m(a,b)}(i,j)$. Thus, for example, if the pixel (a,b) in the mosaic image is red (m(a,b)=red), then the red component of $Î(i,j)$ is considered. The remaining operations are identical to those that were described with reference to FIG. 6.

What is claimed is:

1. A method of manipulating image information comprising the steps of:
   receiving said image information as intensity value acquired from a mosaic pattern of pixel locations in which different pixel location in said mosaic pattern are specific to different colors; and
   demosaicing said image information by determining interpolated intensity values representative of a plurality of colors for said pixel locations of said mosaic pattern, each determination of an interpolated intensity value being specific to a particular said pixel location and including the steps of:
      selecting a neighborhood of said pixel locations, said selecting being based on relative positions of said pixel locations and being independent of photometric similarity of said intensity values for said pixel locations within said neighborhood; and
      basing said determination of said interpolate intensity value on both relative positions of said pixel locations within said neighborhood and said photometric similarities of said intensity values for said pixel locations within said neighborhood.

2. The method of claim 1 wherein said step of demosaicing includes utilizing at least $P_s \times P_t$ different convolution kernels, where $P_s$ is the number of possible color arrangements within a given sized window as said window is manipulated within said mosaic pattern and where $P_t$ is the number of said different colors in said mosaic pattern, each of $P_s$ and $P_t$ being greater than 1.

3. The method of claim 2 wherein said step of receiving said image information includes receiving data representative of intensities of three colors ($P_t$=3) within a mosaic pattern in which $P_s$=4.

4. The method of claim 2 wherein said step of receiving said image information includes utilizing an array of pixel sensors in which said mosaic pattern is an extension of the pattern

| R | G | R | G |
|---|---|---|---|
| G | B | G | B |
| R | G | R | G |
| G | B | G | B. |

5. The method of claim 1 wherein said step of basing said determination of said interpolated intensity value on both relative positions and photometric similarities includes applying a similarity function which is indicative of said photometric similarity among intensity values of said pixel locations within said neighborhood, said similarity function being algorithmically combined with determinations of said relative positions to define said interpolated intensity values.

6. The method of claim 5 wherein said step of applying said similarity function includes determining multipliers on the basis of said photometric similarity, said multipliers being applied on a pixel-to pixel basis to determinations of pixel-to-pixel relative position.

7. The method of claim 1 wherein said step of receiving includes utilizing a two-dimensional array of pixel sensors to generate said intensity values and wherein said step of demosaicing includes providing compensation for properties of a lens system for imaging a scene onto said array.

8. The method of claim 1 wherein said step of basing said determination of said interpolated intensity value on both relative positions and photometric similarities includes determining:
 relative positions of said particular pixel location with respect to each other pixel location in said neighborhood;
 said photometric similarities of said particular pixel location relative to each other pixel location in said neighborhood; and
 an interpolated intensity value that is responsive t said determinations of said relative positions and said photometric similarities.

9. A method of forming an image comprising the step of:
 capturing a multi-color image using an array of sensors, said captured image being in a format representative of a two-dimensional array of pixel locations in which each pixel location has a first pixel value of spectral information that is specific to one of a plurality of colors; and
 deriving second pixel values for said pixel location such that individual said pixel locations have associated spectral information for a plurality of colors, including performing bilateral filtering within pixel sets in determining said second pixel values, each said second pixel value being based on a selected said pixel set of said first pixel values utilizing:
  first weights relating to spatial proximity of a particular pixel location with which said second pixel value is associated to individual pixel locations with which said first pixel values in said selected pixel set are associated; and
  second weights relating to proximity of the first pixel value associated with said particular pixel location to individual said first pixel values in said selected pixel set.

10. The method of claim 9 wherein said step of deriving includes establishing said first and second weights such that
 said first weights are coefficients that decay with increasing distance between said particular pixel location of said second pixel value and said individual pixel locations in said selected pixel set; and
 a said second weights are coefficients that decay with increasing dissimilarity between said first pixel value associated with said particular pixel location and said individual first pixel values in said selected pixel set.

11. The method of claim 9 wherein said step of deriving includes forming a two-dimensional same-color array of pixel locations to each said color of said two-dimensional array that is representative of said captured image.

12. The method of claim 9 wherein said step of deriving includes defining said selected pixel set of first pixel values as those first pixel values that are associated with a window of said pixel locations having said particular pixel location as a general center.

13. A system for manipulating image information comprising:
 an input from a two-dimensional array of sensors in a format representative of a mosaic pattern in which spectral information relating to different colors is stored in discrete pixel locations of said mosaic pattern;
 demosaicing processing enabled to generate intensity values for each of said different colors at each of said discrete pixel locations, said demosaicing processing including a bilateral filter that is configured to access sets of said spectral information of said mosaic pattern and to process each said set of spectral information such that said intensity values generated by said demosaicing processing are based on both relative positions of pixel locations associated with said each set and photometric similarity of spectral information within said each set.

14. The system of claim 13 wherein said demosaicing processing includes a multiplier with a first input that is responsive to relative position between first and second pixel locations associated with said each set and having a second input that is responsive to said photometric similarity of spectral information of said first and second pixel locations.

15. The system of claim 13 further comprising said array of sensors, each said sensor being specific to a particular color, said sensors being arranged in a Bayer pattern.

16. The system of claim 13 wherein said bilateral filter is configured to apply a similarity function as a basis of said photometric similarity, said similarity function providing coefficients that decay toward zero with dissimilarity of spectral information.

17. The system of claim 13 wherein said demosaicing processing includes at least $P_s \times P_t$ convolution kernels for deriving said intensity values from said spectral information of said mosaic pattern, where $P_s$ is the number of possible color arrangements within a given-sized window as said window is manipulated within said mosaic pattern and where $P_t$ is the number of said different colors in said mosaic pattern, each of said $P_s$ and $P_t$ being greater than 1.

18. A system for demosaicing an image comprising:
 a differencing module having a first input that is indicative of intensity of a currently considered pixel, wherein pixels that form said image are successively designated as said currently considered pixel, said differencing module having a second input that is indicative of an intensity of a common-window pixel that is in a same window of pixels as said currently considered pixel, wherein pixels within said same window are successively designated as said common-window pixel, said differencing module having an output that is responsive to a difference in said intensities of said currently considered pixel and said common-window pixel;
 a similarity function module that receives said output from said differencing module and applies a preselected similarity function as a basis of said difference in intensity, said similarity function module having an output that is a function of said difference and said similarity function;
 a first multiplier module having a first input connected to said output of said similarity function module and having a second input that is an element of a convolution kernel selected on a basis of (1) a relative position between said common-window pixel and said currently considered pixel and (2) a relative position of said currently considered pixel within said image and (3) a current output color, wherein colors that form said currently considered pixels in an output image are successively designated as said current output color, said first multiplier module having an output that is responsive to said first and second inputs of said first multiplier module;

a second multiplier module having a first input that is indicative of said intensity of said common-window pixel and having a second input connected to said output of said first multiplier module, said second multiplier module having an output that is responsive to said first and second inputs of said second multiplier module; and a first summation module connected to said output of said second multiplier module, said first summation module being configured to accumulate signals from said second multiplier module for said successive designations of said currently considered pixel, thereby accumulating planes of color-specific intensity information.

19. The system of claim 18 further comprising a second summation module and a divider module that are cooperative with said first summation module to provide normalization, said second summation module being connected to said output of said first multiplier module to accumulate normalization planes of color-specific intensity information, said divider module having a numerator input from said first summation module and having a denominator input from said second summation module, said divider module having an output that is responsive to said first and second inputs.

20. The system of claim 18 wherein said first input of said differencing module receives color-specific intensity data from a convolution system that provides pre-demosaicing of said image, wherein said color-specific intensity data is processed at said differencing module such that a color of said color-specific intensity data remains consistent with a mosaic color associated with said common-window pixel.

21. The system of claim 18 wherein said selection of said convolution kernel for application to said second input of said first multiplier module is based on techniques of Generalized Image Demosaicing and Enhancement (GIDE).

* * * * *